March 29, 1960 C. M. AKER 2,930,936

VIDEO PREAMPLIFIER FOR A MINIMUM COMPONENTS TELEVISION CAMERA

Filed Aug. 2, 1956 2 Sheets-Sheet 1

INVENTOR.
CHARLES M. AKER

BY George C. Sullivan

Agent

March 29, 1960 C. M. AKER 2,930,936

VIDEO PREAMPLIFIER FOR A MINIMUM COMPONENTS TELEVISION CAMERA

Filed Aug. 2, 1956 2 Sheets-Sheet 2

*INVENTOR.*
CHARLES M. AKER
*BY* George C. Sullivan
Agent

United States Patent Office 2,930,936

Patented Mar. 29, 1960

2,930,936

VIDEO PREAMPLIFIER FOR A MINIMUM COMPONENTS TELEVISION CAMERA

Charles M. Aker, North Hollywood, Calif., assignor to Lockheed Aircraft Corporation, Burbank, Calif.

Application August 2, 1956, Serial No. 601,750

5 Claims. (Cl. 315—341)

This invention relates generally to electronic amplifiers and more particularly to a video preamplifier for a subminiature television camera or the like wherein a substantial portion of the preamplifier circuitry is remotely located relative to the preamplifier input.

There are many uses for industrial television equipment which require a camera of much smaller size than those presently available and by utilizing conventional electronic circuits and design techniques, it is not possible to effect the desired size reduction. The level of the signal output from the television pickup tube in the camera is extremely low and in order to transmit the signal from the camera to the camera control unit and maintain the signal level above the noise level the use of a preamplifier is required. Using conventional cascaded grid drive amplifiers to perform the preamplifier function, several stages are required within the camera for driving a cathode follower which feeds a low impedance cable connecting the camera with the camera control unit. The signal level from the television pickup tube is low to begin with and there is an intrinsic amplitude loss in the order of three or five to one in the cathode follower driving a video cable. This obviously complicates the design of the camera and requires the use of several preamplifier stages which limit the minimum size obtainable.

An object of this invention is to provide a television camera which by virtue of the relatively few components required may be made extremely small in size.

Another object of this invention is to provide a subminiature television camera which is capable of operation under low light level conditions to produce picture definition comparable with or better than conventional cameras of the same general type.

Another object of this invention is to provide a video preamplifier circuit enabling the use of only one tube and as little as four condenser and resistor components in the camera as compared with three or four tubes and some twenty or thirty condenser and resistor components required by conventional preamplifier circuits. This is accomplished by means permitting physically locating a substantial part of the preamplifier circuitry remote from the camera.

Another object of this invention is to provide a video preamplifier circuit which will permit operating a subminiature television camera remotely from associated equipment through a coaxial cable of any desired length while transmitting wide band video or pulse information through the cable at sufficiently high levels to overcome hum and noise pickup.

Still another object of this invention is to provide an impedance matching network for a grounded cathode-grounded grid amplifier whereby the two stages may be coupled by a coaxial cable transmission line with substantially no deterioration in amplifier performance.

Further and other objects will become apparent from a reading of the following description, especially when considered in combination with the accompanying drawing wherein like numerals refer to like parts.

Figure 1:
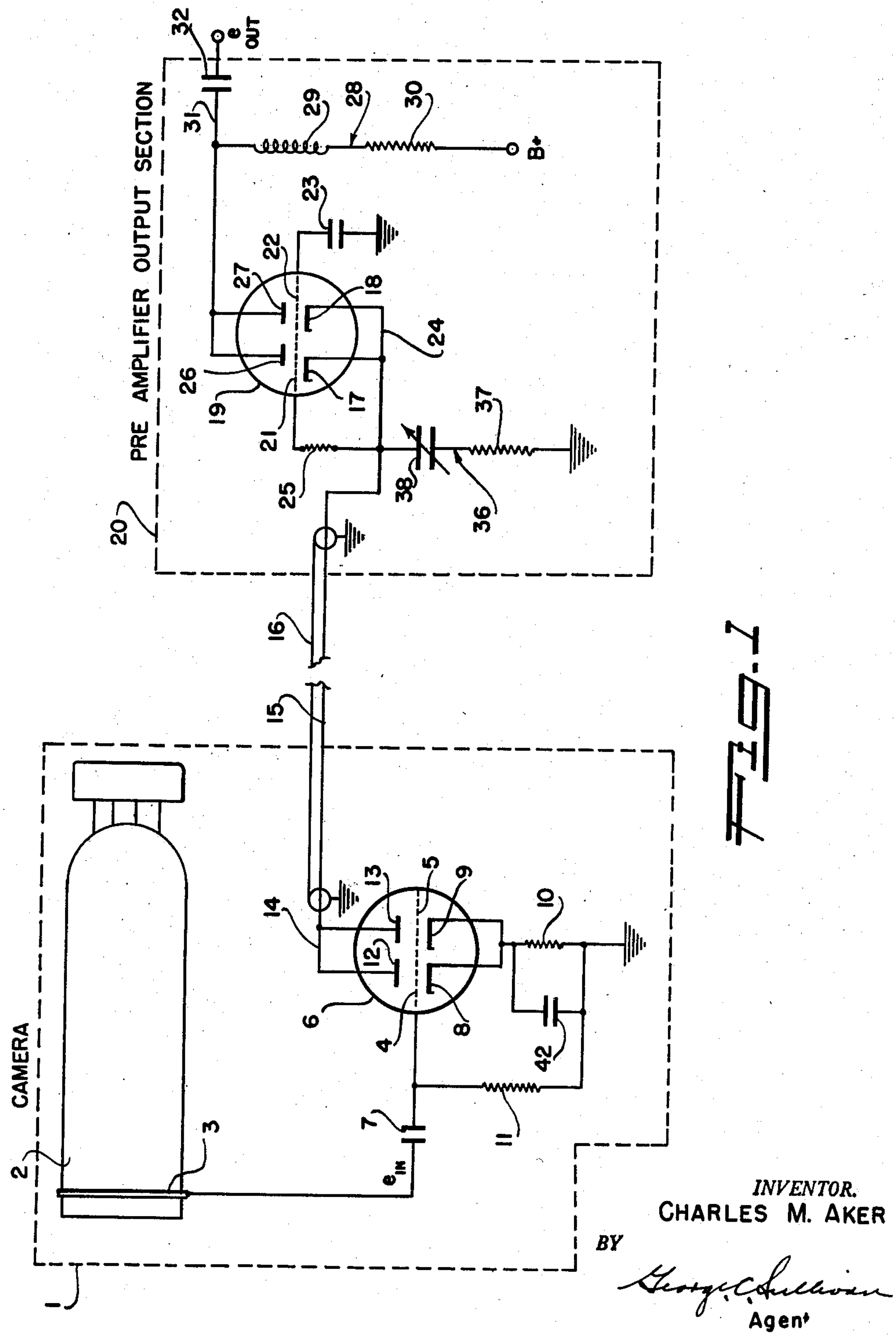
Figure 1 shows schematically the television camera pickup tube and video preamplifier circuit.

Referring to Figure 1 it is seen that camera 1 includes a photosensitive television pickup tube 2 of the conventional vidicon type which provides a low level video signal varying in amplitude and frequency representing an object image. This video signal, identified in the drawing as $e_{in}$, is obtained at an annular conducting flange 3 projecting radially outwardly from the tube wall and applied to the grids 4 and 5 of a dual triode tube 6 through a coupling capacitor 7. The cathodes 8 and 9 of dual triode tube 6 are coupled to a ground through common cathode load resistor 10 and a suitable by-pass capacitor 42. A resistor 11 returns grids 4 and 5 to ground. The plates 12 and 13 are connected by a common lead 14 to the center conductor 15 of a coaxial cable 16.

The grounded cathode stage of the preamplifier, as represented by tube 6, serves as an efficient driver for cable 16, lowering the video signal impedance from approximately 2300 ohms at the output of the photosensitive pickup tube to approximately 300 ohms at plates 12 and 13. At the same time, this tube provides sufficient gain to raise the video signal level above cable noise.

The video signal appearing at the output of coaxial cable 16 is fed directly to cathodes 17 and 18 of a second dual triode tube 19 serving as the preamplifier output section 20. The preamplifier output section is physically remote from the camera which houses the input stage of the preamplifier. Both grids 21 and 22 of tube 19 are coupled to ground through a direct current blocking capacitor 23 and to the cathode input lead 24 through a grid return resistor 25. Plates 26 and 27 of tube 19 both connect with B+ through a single plate load circuit 28 which establishes the bandwidth of the preamplifier circuit. This plate load circuit 28 may consist simply of a coil 29 and a resistor 30 arranged in series. The video preamplifier output signal $e_{out}$ is obtained through lead 31 and a direct current blocking capacitor 32 connecting with plates 26 and 27.

Figures 2, 3, 4:
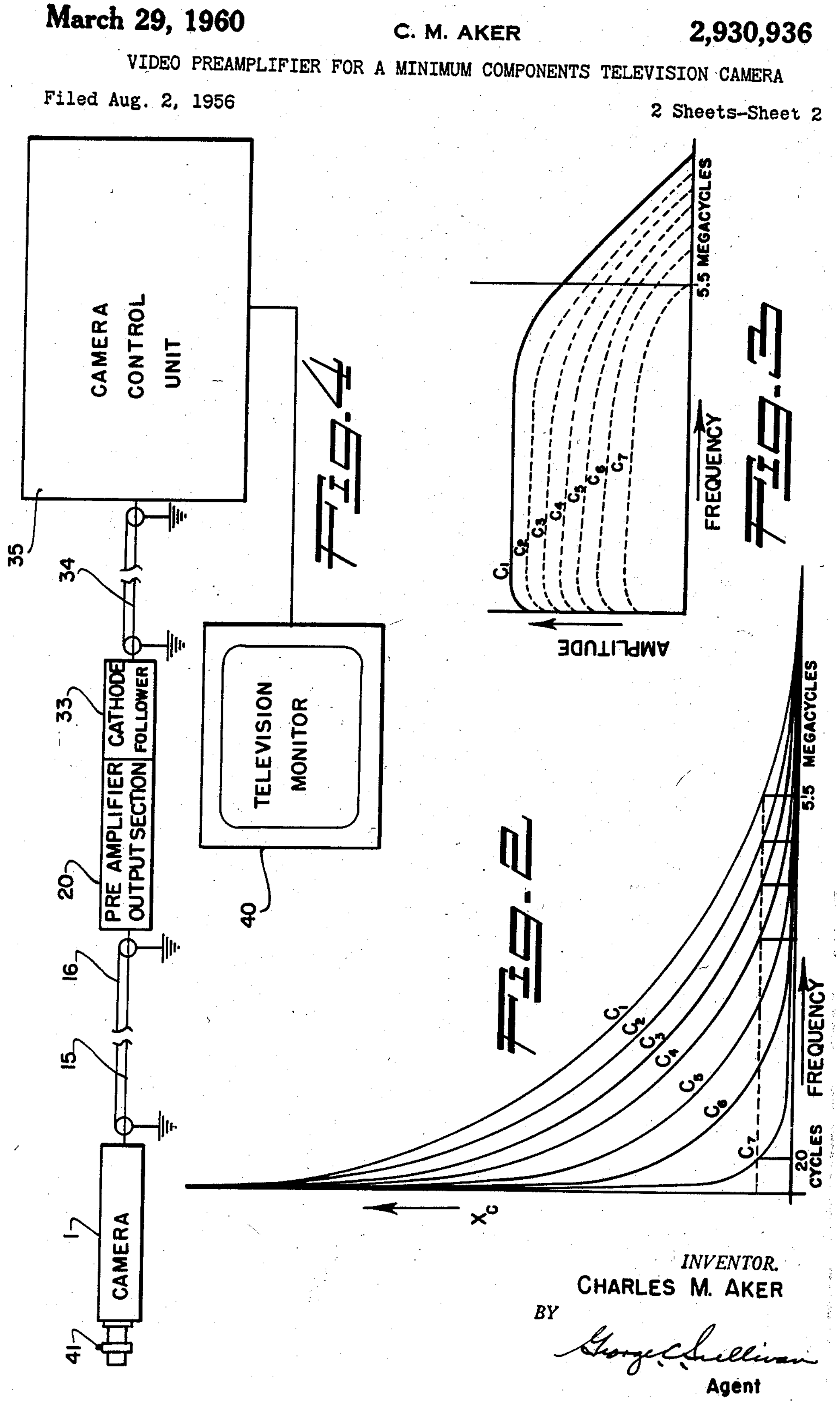
Figure 2 shows graphically the change in capacitive reactance with changes in frequency for various values of capacitance.
Figure 3 shows graphically the change in amplitude with frequency for the preamplifier with different values of capacitance in the cable impedance matching network.
Figure 4 is a schematic block diagram showing a typical closed circuit television system employing the camera and preamplifier circuitry of this invention.

The low lever video signal $e_{in}$ obtained from the television pickup tube in the camera must be amplified in the preamplifier and maintained above the noise level for driving a cathode follower 33 feeding into a low impedance cable 34 connecting the camera with a camera control unit 35 as shown in Figure 4, or, as an alternative, for directly driving conventional grid controlled amplifiers in the camera control unit when cable 34 may be eliminated by physically locating the preamplifier output section inside the camera control unit itself. This alternative arrangement is preferable in many cases when the camera need not be more than approximately 250 feet from the control unit.

The grounded cathode-grounded grid preamplifier circuit is well suited to meeting the requirements for a minimum components camera of small physical size where the preamplifier output section is located remote from the camera and coupled to the preamplifier input section by a long lines coaxial cable as shown in Figure 1, particularly if the characteristic or surge impedance $z_0$ of the cable is matched with the input impedance $z_i$ of the preamplifier output section as hereinafter described.

The distortion and loss in amplitude gain of the video signal in the preamplifier due to impedance mismatch between the surge impedance of the cable and the input impedance of tube 19 in producing reflections becomes serious when the cable length is approximately one-eighth of the wave length of the highest frequencies in the operating bandwidth of the amplifier and becomes progressively more severe as the cable length is increased. Since the operating bandwidth of the video preamplifier is approximately 20 cycles to 5½ megacycles, it is apparent that when cable 16 is no more than 15 to 20 feet in length, deterioration in performance becomes substantial even with an impedance mismatch of no more than 2 to 1.

The video signal frequencies having one-eighth wave length dimensions which are considerably greater than the cable length from the camera to the preamplifier output section produce substantially no reflections in the cable and therefore a slight impedance mismatch at these frequencies is acceptable. It is only the higher frequencies which are damaging. Thus, if the cable is terminated at an impedance which is equal to the cable surge impedance for only the higher frequencies in the operating bandwidth of the preamplifier, good performance may be maintained even though the grounded cathode section as represented by tube 6 is physically remote from the ground grid section represented by tube 19.

By using a video cable 16 of reasonable physical size, the nominal surge impedance $z_0$ is in the order of 90 to 125 ohms for the required operating bandwidth of the preamplifier of approximately 20 cycles to 5½ megacycles. The input impedance of tube 19, using a dual triode arrangement as disclosed to obtain a high $g_m$, may be made as low as 250 ohms. Even with the most judicious selection of the circuit components, a sizeable mismatch between the surge impedance of the cable and the input impedance of tube 19 exists. To correct this impedance mismatch and prevent reflections on the cable from deteriorating preamplifier performance, an impedance matching network 36 is arranged in parallel with cable 16 and coupled to the common cathodes 17 and 18 of tube 19. Resistor 37 in the impedance matching network is chosen to produce an equivalent parallel circuit impedance to match the cable surge impedance in accordance with the following relationship.

$$z_0=\frac{1}{\frac{1}{z_i}+\frac{1}{r}}$$

Where $r$ is the resistance in ohms for resistor 37.

Since tubes 6 and 19 in the circuit must have a common plate current for proper operation as a grounded cathode-grounded grid amplifier, a capacitor 38 must be employed in impedance matching network 36 for blocking direct current through resistor 37. As will be explained, the optimum value for capacitor 38 in the impedance matching network 36 is a function of the length of coaxial cable 16.

Referring to Figure 2 it is seen that for different values of capacitance C1, C2, C3, etc., the capacitive reactance $x_c$ of capacitor 38 in the impedance matching network 36, increases asymptotically with decreasing frequency and that at the smaller values of capacitance as represented by C1, C2, etc. the capacitive reactance is greater than that of the larger values of capacitance as represented by C6, C7, etc. Since the capacitive reactance approaches zero at an infinite frequency and infinity at zero frequency, the effect of capacitor 38 on the impedance offered by the impedance matching network is nonlinear and substantial in magnitude in the lower frequency region of the operating bandwidth of the amplifier unless very large values of capacitance are employed.

Since the characteristic impedance of cable 16 is matched by the use of resistor 37 in the impedance matching network, the capacitive reactance offered by capacitor 38 beyond that which is negligible as compared with the impedance offered by the resistor is undesirable. It therefore logically follows that the value of capacitor 38 should be relatively large so that its capacitive reactance is negligible at all frequencies in the bandwidth. However, the larger the capacitor in the impedance matching network 36, the greater is the loss in over-all amplifier gain as indicated in Figure 3. Therefore, it is necessary to employ no greater capacitance than is required for avoiding producing reflections at a given cable length. By employing a variable capacitor as indicated in Figure 1, the impedance matching network 36 may be optimized to substantially eliminate reflections and at the same time effect the smallest possible loss in gain. Obviously, the maximum cable length which may be employed in remotely locating the preamplifier output section will be limited by the amount of capacitance required in the impedance matching network to minimize reflections in the line and still provide a video signal gain which is adequate for feeding a cable through a cathode follower or driving subsequent amplifier stages in the camera control unit.

The circuit as illustrated in Figure 1 will permit coaxial cable lengths of as much as 250 feet or more to be used in remotely locating the preamplifier output section, without noticeably deteriorating the operating performance of the camera within the 20 cycle to 5½ megacycle bandwidth.

Where the camera control unit such as that shown in Figure 4 may be located at a distance no greater than the maximum length of coaxial cable 16 between the camera and the preamplifier output section, the latter may be built into the control unit and the preamplifier output fed directly to subsequent amplifier stages and raised to a suitable level for driving television monitor 40. However, where a greater distance is required between the camera and the camera control unit, the preamplifier output may be used to drive a cathode follower 33 or the like feeding the video signal into cable 34 to subsequent amplifier stages in the camera control unit or in the line. The cable length at the output of the cathode follower is normally limited to approximately 500 feet due to losses in the cable, however, there is obviously no limit to the spacing between the camera and the camera control unit provided amplifiers are employed at intervals in the line to maintain the video signal at a working level.

In operation, the camera control unit 35 provides the control voltages for photosensitive television pickup tube 2 in camera 1. The field of view through camera lens head 41 is impressed upon the photosensitive television pickup tube to provide a video signal identifier as $e_{in}$ which is applied to the grid of the grounded cathode stage of the preamplifier. The video signal which is an alternating current varying in both amplitude and frequency is applied to the center conductor of coaxial cable 16 through plates 12 and 13 in dual triode 6. At the terminal end of cable 16 the video signal is applied to common cathodes 17 and 18 in tube 19 to modulate the current flow through the preamplifier in accordance with the amplitude of the video signal. The voltage changes at plates 26 and 27 as a result of the video signal bein applied to cathodes 17 and 18 provides the output for the preamplifier.

Through the use of impedance matching network 36 substantially no reflections are produced in cable 16 allowing the video signal level to remain substantially undistorted and above the noise level for amplification at tube 19. Sufficient gain from tube 6 is obtained to permit the normal attentuation of the signal in the coaxial cable due to the line impedance and still provide adequate amplitude for driving tube 19 in the preamplifier output section where substantially all the net gain from the preamplifier is obtained.

While the preferred impedance matching network employs a variable capacitor and fixed resistor as hereinbefore described, it is obviously possible to hold capacitor 38 fixed and compensate for changes in length of the coaxial cable 16 by varying resistor 37. With this modification the capacitive reactance of capacitor 38 performs a substantial part of the impedance matching function with resistor 37 providing the necessary additional impedance for matching the surge impedance of cable 16 with the input impedance of tube 19. A further variation of the impedance matching network within the teachings of this invention is to hold both the resistor and capacitor constant, with the values selected for a fixed length of cable.

The preamplifier circuit is described herein in connection with a minimum components camera, however, it is obviously useful in many other applications where miniaturization of equipment is important.

It should be understood that certain alterations, modifications and substitutions such as is pointed out hereinabove may be made to the instant disclosure without departing from the spirit and scope of the invention as defined by the appended claims.

I claim:

1. A subminiature television camera, a chassis, a photosensitive pickup tube carried by said chassis and providing an alternating current video signal representing the image of an object within the camera field of view, a pair of electron tubes each having a plate, a cathode and a control grid, one of said tubes being mounted on the chassis and having the pickup tube video signal applied to its control grid, a coaxial cable transmission line directly coupling the plate of said one tube with the cathode of the other tube for amplifying the video signal and supplying the plate current to said other tube, output means connecting with the plate of said other tube for extracting the amplified signal, and an adjustable impedance circuit connected with the cathode of said other tube and arranged in parallel with said transmission line for matching the cable impedance of said other tube throughout at least a portion of the preamplifier bandwidth whereby the pair of electron tubes may be physically separated from each other with but negligible deterioration in amplifier performance.

2. The subminiature television camera of claim 1 wherein said other tube is a grounded grid amplifier and said impedance circuit is a series capacitance-resistance network.

3. A subminiature television camera comprising, a chassis, a photosensitive vidicon tube mounted thereon, an input amplifier stage carried by said chassis and connected to said vidicon tube, a grounded grid output amplifier stage physically remote from said input stage, a transmission line coupling the input stage with the output stage in series to provide a common current path therethrough, and an impedance matching network arranged in parallel with said transmission line and connecting with the output stage for matching the transmission line impedance with the load impedance offered by the output stage throughout at least a portion of the amplifier operating bandwidth.

4. The subminiature television camera of claim 3 in which said input amplifier stage is a grounded cathode tube and said transmission line connects the output of the said grounded cathode with the cathode of the output stage whereby the input and output stages may be physically separated from one another.

5. The subminiature television camera of claim 3 in which said impedance matching network comprises a direct current blocking capacitor arranged in series with a resistor.

References Cited in the file of this patent

UNITED STATES PATENTS

| | | |
|---|---|---|
| 2,302,798 | Percival | Nov. 24, 1942 |
| 2,330,109 | Brown | Sept. 21, 1943 |
| 2,524,821 | Montgomery | Oct. 10, 1950 |
| 2,571,045 | Macnee | Oct. 9, 1951 |
| 2,585,008 | Hallmark | Feb. 12, 1952 |